(12) United States Patent
Crosby et al.

(10) Patent No.: US 7,499,901 B2
(45) Date of Patent: *Mar. 3, 2009

(54) RANKING ITEMS

(75) Inventors: Will Crosby, Jamaica Plain, MA (US); Dan Porter, Portland, ME (US)

(73) Assignee: IdealsWork Inc., Portland, ME (US)

( * ) Notice: Subject to any disclaimer, the term of this patent is extended or adjusted under 35 U.S.C. 154(b) by 261 days.

This patent is subject to a terminal disclaimer.

(21) Appl. No.: 11/326,076

(22) Filed: Jan. 5, 2006

(65) Prior Publication Data
US 2006/0184495 A1  Aug. 17, 2006

Related U.S. Application Data

(63) Continuation of application No. 10/071,685, filed on Feb. 8, 2002, now Pat. No. 7,003,503.

(60) Provisional application No. 60/296,546, filed on Jun. 7, 2001.

(51) Int. Cl.
*G06F 17/00* (2006.01)
*G06N 5/02* (2006.01)

(52) U.S. Cl. ............................ 706/48; 706/46; 706/47

(58) Field of Classification Search .................. 706/48, 706/46, 47; 707/5; 705/36, 26
See application file for complete search history.

(56) References Cited

U.S. PATENT DOCUMENTS

| 5,321,833 | A | 6/1994 | Chang et al. | |
|---|---|---|---|---|
| 5,765,150 | A * | 6/1998 | Burrows | 707/5 |
| 5,913,202 | A | 6/1999 | Motoyama | |
| 6,038,554 | A * | 3/2000 | Vig | 705/400 |
| 6,236,990 | B1 * | 5/2001 | Geller et al. | 707/5 |
| 6,313,833 | B1 | 11/2001 | Knight | |
| 2001/0032156 | A1 * | 10/2001 | Candura et al. | 705/36 |
| 2001/0034686 | A1 | 10/2001 | Eder | |
| 2001/0037233 | A1 | 11/2001 | Kinoshita | |
| 2002/0004758 | A1 * | 1/2002 | Takechi | 705/26 |
| 2002/0032629 | A1 * | 3/2002 | Siegel et al. | 705/36 |
| 2002/0116309 | A1 | 8/2002 | Keyes et al. | |

FOREIGN PATENT DOCUMENTS

WO  92/04681  3/1992

OTHER PUBLICATIONS

Benjamin Hollister et al:, *Shopping for a Better World: The Quick and Easy Guide to All Your Socially Responsible Shopping*, 1994 Sierra Club Books, San Francisco, CA. (Table of Contents only).
Benjamin Hollister et al. Shopping for a Better World: The Quick and Easy Guide to All Your Socially Responsible Shopping, 1994 Sierra Club Books, 6-9.

* cited by examiner

*Primary Examiner*—Joseph P Hirl
(74) *Attorney, Agent, or Firm*—Fish & Richardson P.C.

(57) ABSTRACT

A method of ranking items includes displaying a set of categories. Each category has a set of weights for a user to choose. Each item is associated with the set of categories. The method also includes displaying a search result based on the weights chosen by the user. The search result includes a ranking of the items.

40 Claims, 10 Drawing Sheets

FIG. 1

| COMPANIES | Environment | Animals | Diversity | Women's Rights | Community | Etcetera |
|---|---|---|---|---|---|---|
| Sample, Inc. | 1 | 1 | 3 | 1 | 1 | 5 |
| Acme International | 3 | 5 | 5 | 2 | 5 | 2 |
| Universal Ltd. | 4 | 4 | 4 | 4 | 4 | 3 |
| Brand X | 5 | 5 | 2 | 5 | 5 | 5 |
| Ace Manufacturing | 5 | 2 | 1 | 2 | 3 | 4 |
| Etcetera | 2 | 4 | 5 | 4 | 2 | 5 |

FIG. 2A

| COMPANIES | Composite |
|---|---|
| Sample, Inc. | 2 |
| Acme International | 4 |
| Universal Ltd. | 4 |
| Brand X | 5 |
| Ace Manufacturing | 3 |
| Etcetera | 4 |

| Results | 5 Stars | 4 Stars | 3 Stars | 2 Stars | 1 Star |
|---|---|---|---|---|---|
| 1 | 0 | 0 | 0 | 0 | 0 |
| 2 | 0 | 1 | 0 | 1 | 0 |
| 3 | 1 | 0 | 1 | 0 | 1 |
| 4 | 1 | 1 | 0 | 1 | 1 |
| 5 | 1 | 1 | 1 | 1 | 1 |
| 6 | 1 | 1 | 2 | 1 | 1 |
| 7 | 1 | 2 | 1 | 2 | 1 |
| 8 | 1 | 2 | 2 | 2 | 1 |
| 9 | 1 | 2 | 3 | 2 | 1 |
| 10 | 1 | 3 | 2 | 3 | 1 |
| 11 | 1 | 3 | 3 | 3 | 1 |
| 12 | 2 | 3 | 2 | 3 | 2 |
| 13 | 2 | 3 | 3 | 3 | 2 |
| 14 | 2 | 3 | 4 | 3 | 2 |
| 15 | 2 | 4 | 3 | 4 | 2 |
| 16 | 2 | 4 | 4 | 4 | 2 |
| 17 | 2 | 4 | 5 | 4 | 2 |
| 18 | 2 | 5 | 4 | 5 | 2 |
| 19 | 2 | 5 | 5 | 5 | 2 |
| 20 | 3 | 5 | 4 | 5 | 3 |
| 21 | 3 | 5 | 5 | 5 | 3 |
| 22 | 3 | 5 | 6 | 5 | 3 |
| 23 | 3 | 6 | 5 | 6 | 3 |
| 24 | 3 | 6 | 6 | 6 | 3 |
| 25 | 3 | 6 | 7 | 6 | 3 |
| 26 | 3 | 7 | 6 | 7 | 3 |
| 27 | 3 | 7 | 7 | 7 | 3 |
| 28 | 4 | 7 | 6 | 7 | 4 |
| 29 | 4 | 7 | 7 | 7 | 4 |
| 30 | 4 | 7 | 8 | 7 | 4 |
| 31 | 4 | 8 | 7 | 8 | 4 |
| 32 | 4 | 8 | 8 | 8 | 4 |
| 33 | 4 | 8 | 9 | 8 | 4 |
| 34 | 4 | 9 | 8 | 9 | 4 |
| 35 | 4 | 9 | 9 | 9 | 4 |
| 36 | 5 | 9 | 8 | 9 | 5 |
| 37 | 5 | 9 | 9 | 9 | 5 |
| 38 | 5 | 9 | 10 | 9 | 5 |
| 39 | 5 | 10 | 9 | 10 | 5 |
| 40 | 5 | 10 | 10 | 10 | 5 |
| 41 | 5 | 10 | 11 | 10 | 5 |
| 42 | 5 | 11 | 10 | 11 | 5 |
| 43 | 5 | 11 | 11 | 11 | 5 |
| 44 | 6 | 11 | 10 | 11 | 6 |
| 45 | 6 | 11 | 11 | 11 | 6 |
| 46 | 6 | 11 | 12 | 11 | 6 |

RANKING ITEMS

CROSS-REFERENCE TO RELATED APPLICATIONS

This application is a continuation application of (and claims the benefit of priority under 35 U.S.C. 120) of U.S. application Ser. No. 10/071,685, filed Feb. 8, 2002 now U.S. Pat. No. 7,003,503, and entitled "RANKING ITEMS", which claimed priority from U.S. Provisional Application No. 60/296,546, filed Jun. 7, 2001, and titled "Evaluative Method for Ranking Items," which is incorporated by reference.

BACKGROUND

This invention relates to ranking items. Information about the social and environmental practices of companies has been collected and distributed since the 1970s by investment funds, consumer-information organizations and research firms. Typically, the information is used to quantify the relative performance of companies on issues of "social responsibility" such as management diversity, involvement with repressive international regimes, environmental destructiveness and cruelty to animals in product testing.

SUMMARY

In one aspect the invention is a method of ranking items. The method includes displaying a set of categories. Each category has a set of weights for a user to choose. Each item is associated with the set of categories. The method also includes displaying a search result based on the weights chosen by the user. The search result includes a ranking of the items.

This aspect may have one or more of the following embodiments. The method includes using each category as an area of social responsibility. The method includes displaying a set of factors for each category when selected by the user where each factor capable of being chosen by the user; and collating the categories weighted by the user. The factors are chosen by the user and a product is chosen by the user. The method includes selecting a list of companies that have the product, and determining a rating for each company based on the categories weighted by the user and the factors chosen by the user. Selecting a list of companies includes finding a set of brands associated with the product and finding the company associated with each brand. Displaying a search result includes displaying the search result based on the factors chosen by the user. Displaying a search result comprises ranking the brands on a five-star scale. The five-star scale includes a one-star rating, a two-star rating, a three-star rating, a four-star rating, and a five-star rating. The method includes using the five-star rating as the best rating of the ratings determined. The method includes receiving information from an external database and quantifying the data on a scale. Displaying a search result includes displaying a ranking of companies.

In another aspect, the invention is an apparatus. The apparatus includes a memory that stores executable instructions for ranking items based on a set of user preferences and a processor. The processor executes instructions to display a set of categories. Each category has a set of weights for a user to choose. Each item is associated with the set of categories. The process also executes instructions to display a search result based on the weights chosen by the user, the search result including a ranking of the items.

This aspect may have one or more of the following embodiments. The processor includes instructions to use each category as an area of social responsibility. The processor includes instructions to display a set of factors for each category when selected by the user. Each factor is capable of being chosen by the user. The processor includes instructions to collate the categories weighted by the user where the factors are chosen by the user and a product is chosen by the user. The processor includes instructions to select a list of companies that have the product and to determine a rating for each company based on the categories weighted by the user and the factors chosen by the user. The instructions to select a list of companies includes instructions to find a set of brands associated with the product and to find the company associated with each brand. The instructions to display a search result includes instructions to display the search result based on the factors chosen by the user. The instructions to display a search result includes instructions to rank the brands on a five-star scale. The five-star scale includes a one-star rating, a two-star rating, a three-star rating, a four-star rating, and a five-star rating. The processor also includes to use the five-star rating as the best rating of the ratings determined. The processor includes instructions to receive information from an external database and to quantify the data on a scale. The instructions to display a search result includes instructions to display a ranking of companies.

In still another aspect, the invention is an article. The article includes a machine-readable medium that stores executable instructions for ranking items based on a set of user preferences. The instructions cause a machine to display a set of categories. Each category has a set of weights for a user to choose. Each item is associated with the set of categories. The instructions also cause a machine to display a search result based on the weights chosen by the user, the search result including a ranking of the items.

This aspect, may have one or more of the following embodiments. The medium stores executable instructions that cause a machine to use each category as an area of social responsibility. The medium stores executable instructions that cause a machine to display a set of factors for each category when selected by the user. Each factor is capable of being chosen by the user. The medium also stores executable instructions to collate the categories weighted by the user. The factors are chosen by the user, and a product is chosen by the user. The medium stores executable instructions that cause a machine to select a list of companies that have the product and to determine a rating for each company based on the categories weighted by the user and the factors chosen by the user. The executable instructions that causing a machine to select a list of companies includes executable instructions that causing a machine to find a set of brands associated with the product and to find the company associated with each brand. The executable instructions that cause a machine to display a search result includes executable instructions that cause a machine to display the search result based on the factors chosen by the user. The executable instructions that cause a machine to display a search result includes executable instructions that cause a machine to rank the brands on a five-star scale. The five-star scale includes a one-star rating, a two-star rating, a three-star rating, a four-star rating, and a five-star rating. The medium stores executable instructions that cause a machine to use the five-star rating as the best rating of the ratings determined. The medium stores executable instructions that cause a machine to receive information from an external database and to quantify the data on a scale. The executable instructions that cause a machine to display a search result includes executable instructions that cause a machine to display a ranking of companies.

Some or all of the aspects of the invention described above may have some or all of the following advantages. The invention allows the user to choose categories important to the user. In addition, the user can also choose which factors are included in each category. Thus, the user can purchase products from companies based on the user's individual preferences in social responsibility issues.

DESCRIPTION

Figure 1:
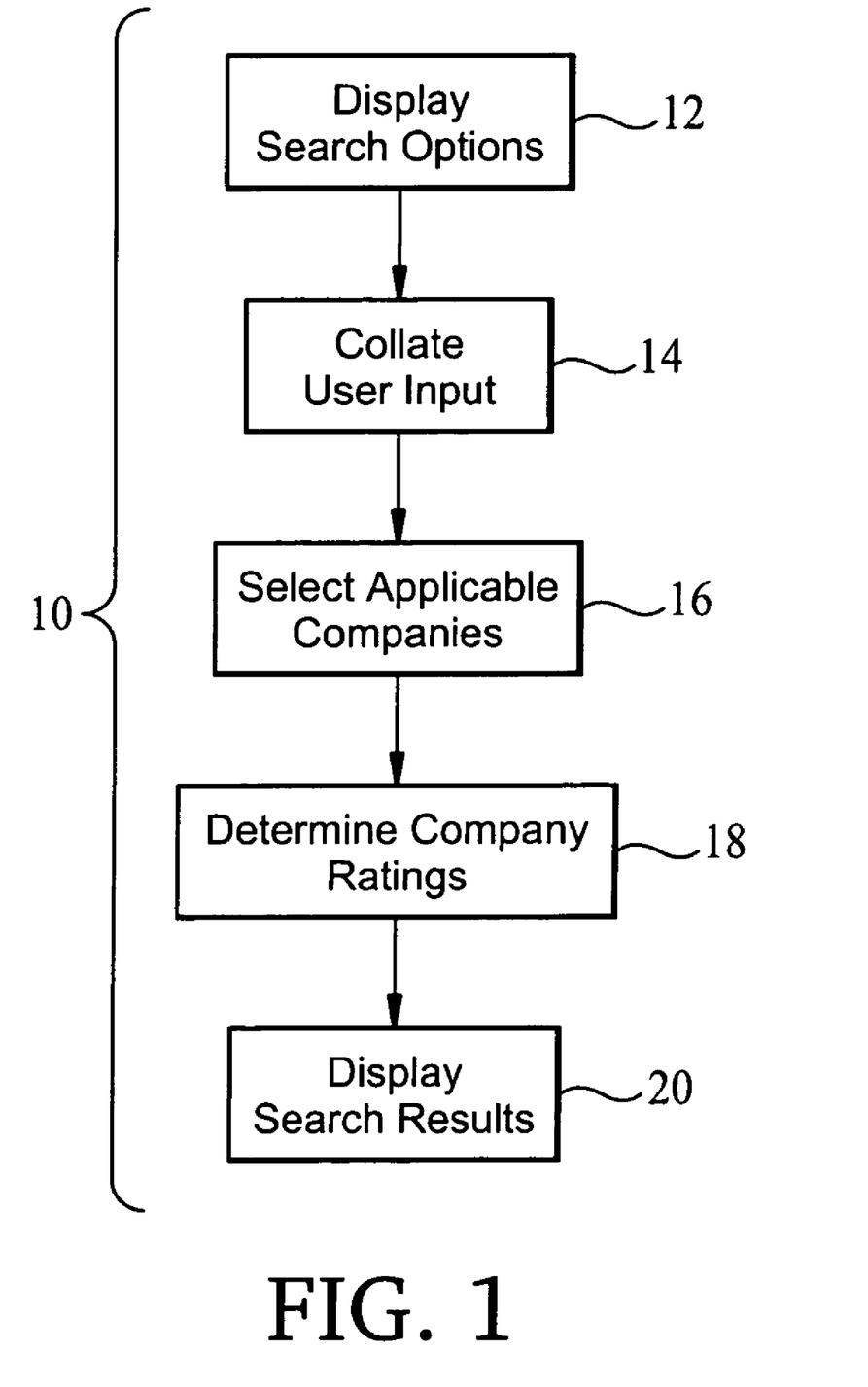
FIG. 1 is a flowchart of a process for ranking items.

Referring to FIG. 1, process 10 is a method for ranking items based on a user's preferences. Process 10 allows the user to choose categories to determine a ranking of items. Each category has a categorical score associated with a corresponding item. As will be explained below, each category includes factors that make up the categorical score so that a user can eliminate from consideration factors that are not important to the user in ranking the items. Process 10 also weights each of the categories chosen by the user. Process 10 retrieves the categorical scores from a database and ranks the items based on the user's chosen categories and factors and the corresponding chosen weights.

Process 10 allows a user to choose and weigh categories related to social responsibility with the option of eliminating undesirable factors and to rank companies so that a user can make a decision informed by a user's individual preferences when purchasing a product. Specifically, process 10 displays search option (12), collates user input (14), selects applicable companies (16), determines company ratings (18), and displays search results (20).

Figure 2A:
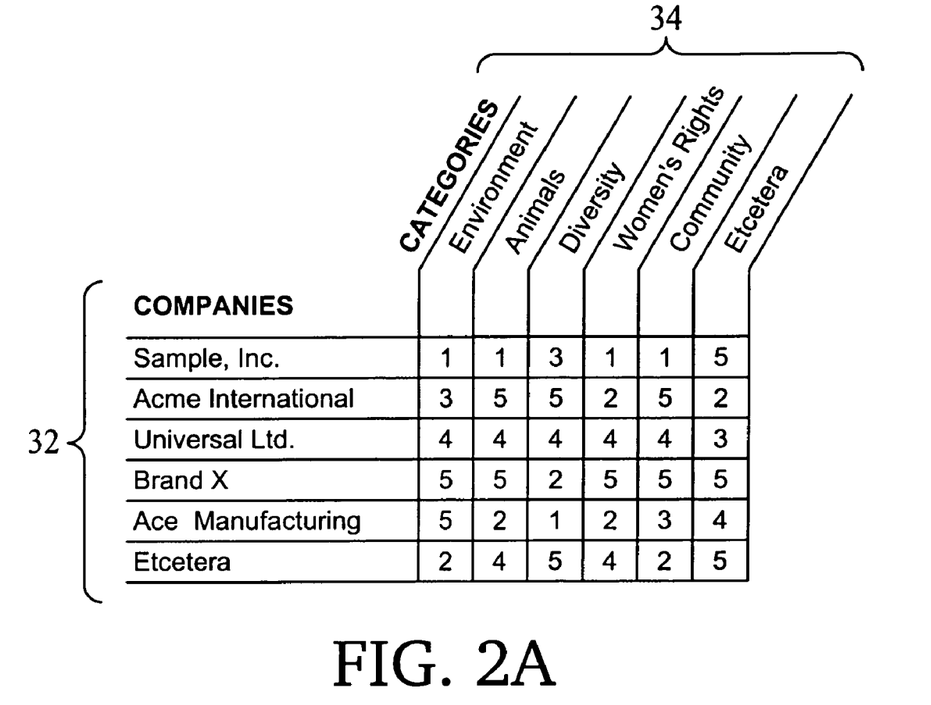
FIG. 2A is a table for showing criteria versus companies.
Figure 2B:
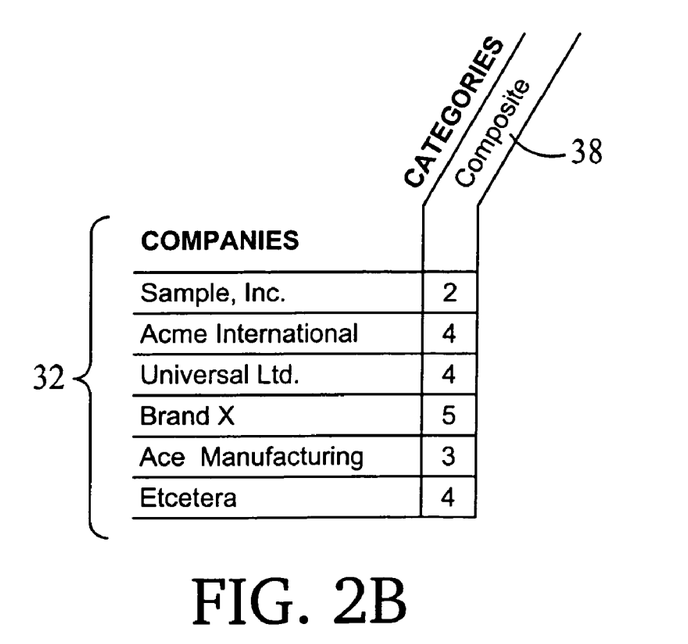
FIG. 2B is a table showing the composite score of the criteria for each company.

Referring to FIGS. 2A and 2B, process 10 enables the user to choose specific categories and factors important to the user. For example, in a list of companies 32, each company has a categorical score for each "social responsibility" category included in the list of categories. Process 10 allows the user to isolate one or more of the categories. In other words, there is a means for the user to choose a few categories, and thereby eliminate those categories that the user is not interested in. In addition, the user is able to weight the categories and/or eliminate any of the factors that make-up the categorical score. With process 10, the user has more options than receiving a composite score 38, which would be an average of all the categories in the list of categories 34.

Figure 3:
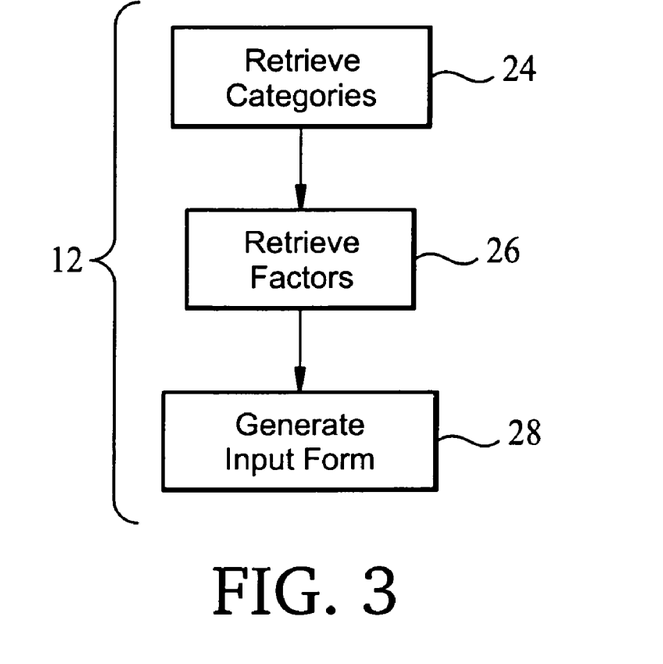
FIG. 3 is a flowchart for displaying search options.
Figure 4A:
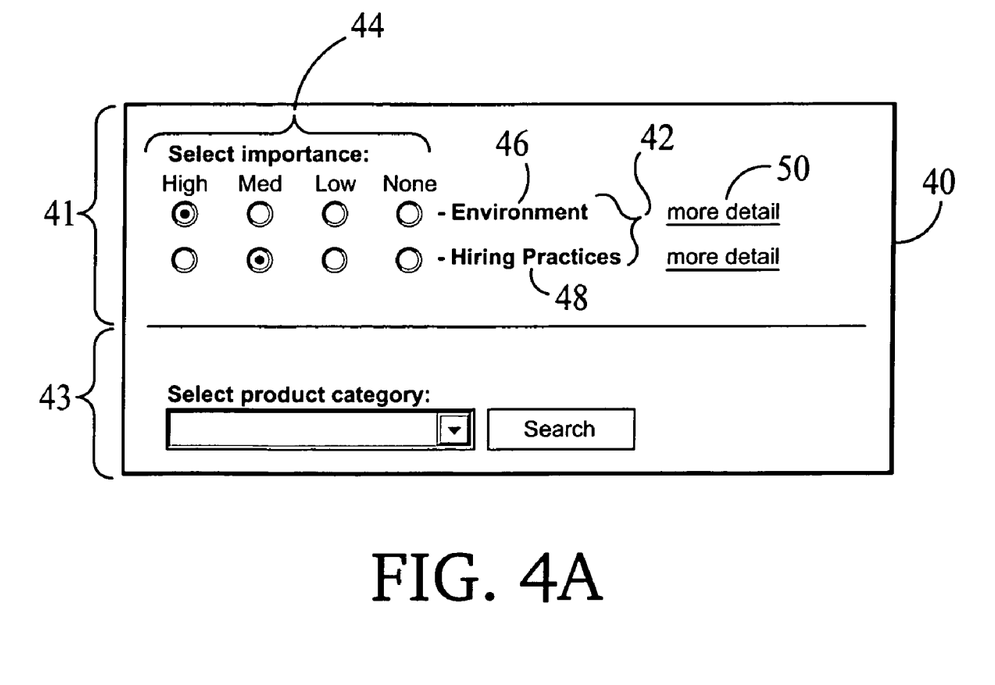
FIG. 4A is a screenshot of a hyper text markup language (HTML) input form.

Referring to FIGS. 3 and 4A, process 10 allows the user to do a search of companies that offer a product the user wishes to buy and to rank those companies based on the social responsibility categories weighted and the factors chosen by the user. Process 10 displays (12) search options for the user to select (FIG. 1). An exemplary implementation of displaying the search options seeks to pull all the available information on the categories and the factors from a database and format the information so a user can choose amongst the information. Process 12 retrieves (24) all data categories of social responsibility sorted in the order specified in the database. For each category, process 12 also retrieves (26) the factors for each category sorted in the order specified by the database. Process 12 generates (28) a hyper text markup language (HTML) input form 40.

An exemplary implementation of generating an input form 40 is shown in FIGS. 4A-4E. The HTML input form 40 has a social responsibility preferences section 41 and a product category section 43. The social responsibility preferences section 41 has a list of "social responsibility" categories 42. The user chooses, from a list of importance values 44, the relative importance of each category 42. The list of importance values 44 includes values of "high," "medium," "low" or "none". The user chooses one of the values for each category. As will be explained below, a "high" is weighted a "4," "medium" is weighted a "2," and "low" is weighted a "1" and "none" is weighted a zero. If the user chooses none of the importance values 44, a value of "none" is chosen by process 10. Therefore, the user can choose and weight each of the categories in the list of categories 42 such as an "Environment" category 46 and a "Hiring Practices" category 48.

Figure 4B:
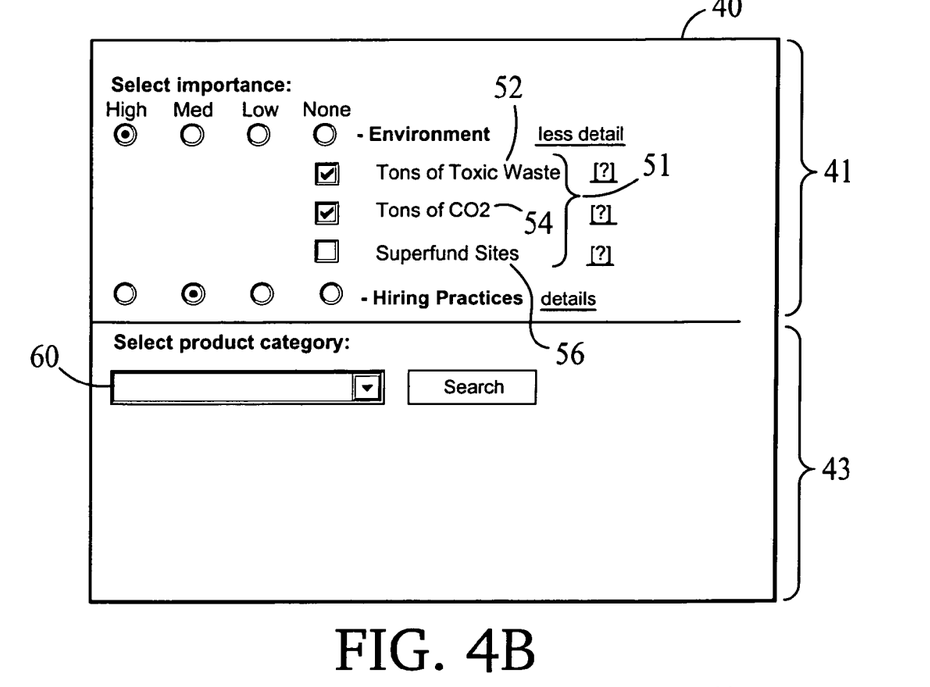
FIG. 4B is a screenshot of the HTML input form with a category expanded to show a set of factors.

The user can expand a category to observe a list of factors that make up the category by moving a cursor on a phrase "details" 50 beside the desired category and clicking a mouse button. In other embodiments, other hyperlinks such as icons are used. As illustrated in FIG. 4B, when expanded, the "Environment" category 46 has a list of "Environment" factors 51 that include a "Tons of Toxic Waste" factor 52, a "Tons of $CO_2$" factor 54, and a "Superfund Sites" factor 56. The "Hiring Practices" category is made-up of a "Minority Workers" factor (not shown) and a "Female CEO" factor (not shown). The user has the option of weighting the entire category. For example, the "Hiring Practices" category 48 is ranked "medium." The user has another option of choosing factors within a category for consideration in the ranking determination. For example, the factors of "Tons of Toxic Waste" 52 and "Tons of $CO_2$" 56 are chosen from the "Environment" category 46 so that the "Superfund Sites" factor 58 will not be considered in an "Environment" categorical score.

Figure 4C:
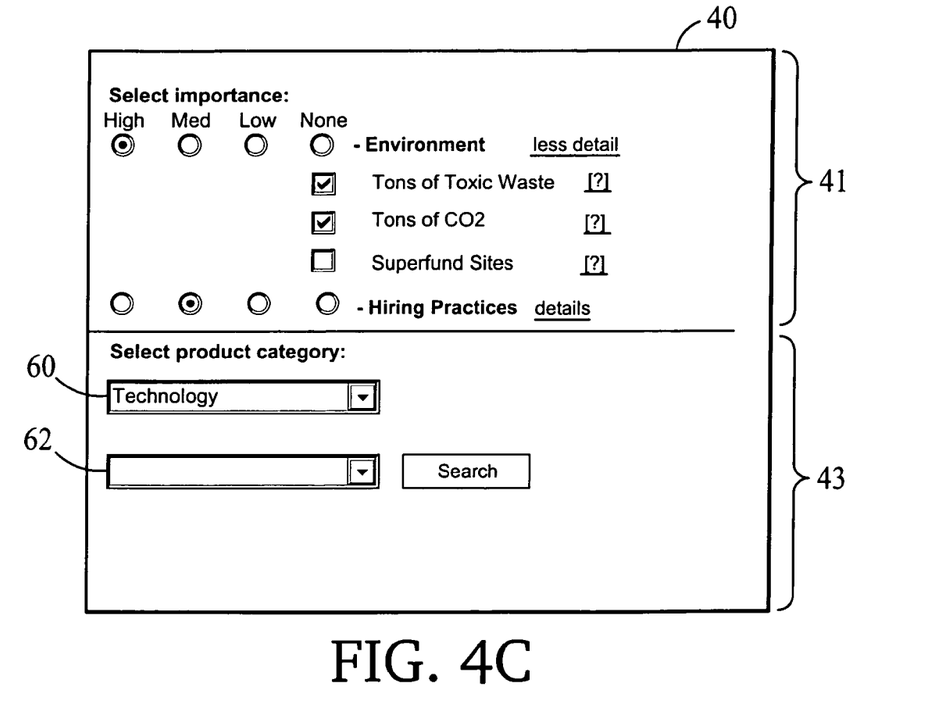
FIG. 4C is a screenshot of the HTML input with a second pull-down menu.
Figure 4D:
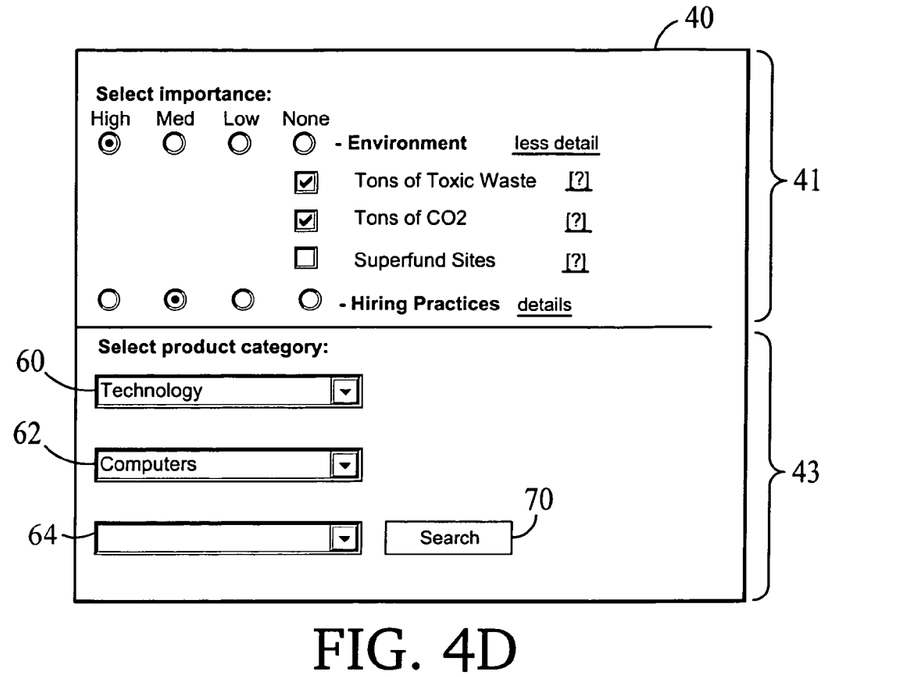
FIG. 4D is a screenshot of the HTML input with a third pull-down menu.
Figure 4E:
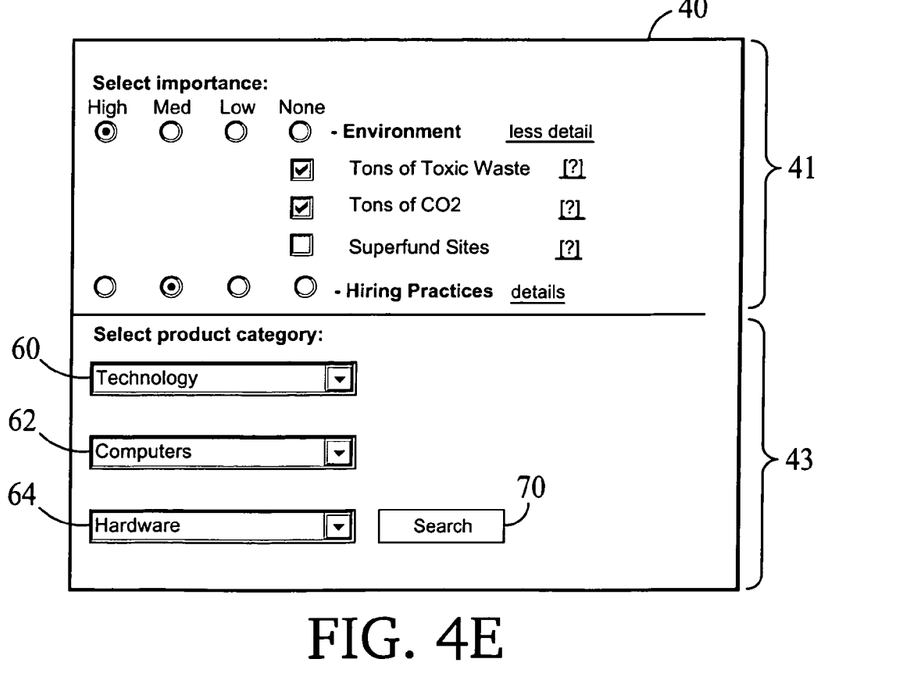
FIG. 4E is a screen shot after a user has filled-out the HTML input form.

Referring to FIG. 4C, once the user has specified the user's preferences in the social responsibility preferences section 41, the user inputs information on the product the user seeks to purchase in the product category section 43. The user picks a broad description of a product area where the product can be found in from a first pull-down menu 60. Process 10 then automatically generates a second pull-down menu 62 that lists types of products within the broad description. Process 10 will also generate a third pull-down menu 64 to focus on a specific area of products as shown in FIG. 4D. For example, a user wishes to use the "social responsibility" preferences to find a company that produces computer hardware. The user would select "technology" in the first pull-down menu 60 from a list (not shown) of other broad areas. The second pull-down menu 62 is generated which has a sub-area of "technology." The user would select "computers" in the second pull-down menu 62. The third pull-down menu 64 has products under "computers." The user would select "hardware" in the third pull-down menu 64, as shown in FIG. 4E.

After the user has filled out both sections, the social responsibility preference section 41 and the product category section 43, the information is ready to be searched. The user starts the search by moving the cursor on the "search" button 70 and clicking a mouse button.

In this embodiment, process 10 is available at a website. If the user registers at the website, the user's preferences will be stored so that the next time the user visits the site, the HTML input form 40 will already be filled out based on the previous search so that the user only needs to fill out product category section 43.

Figure 5:
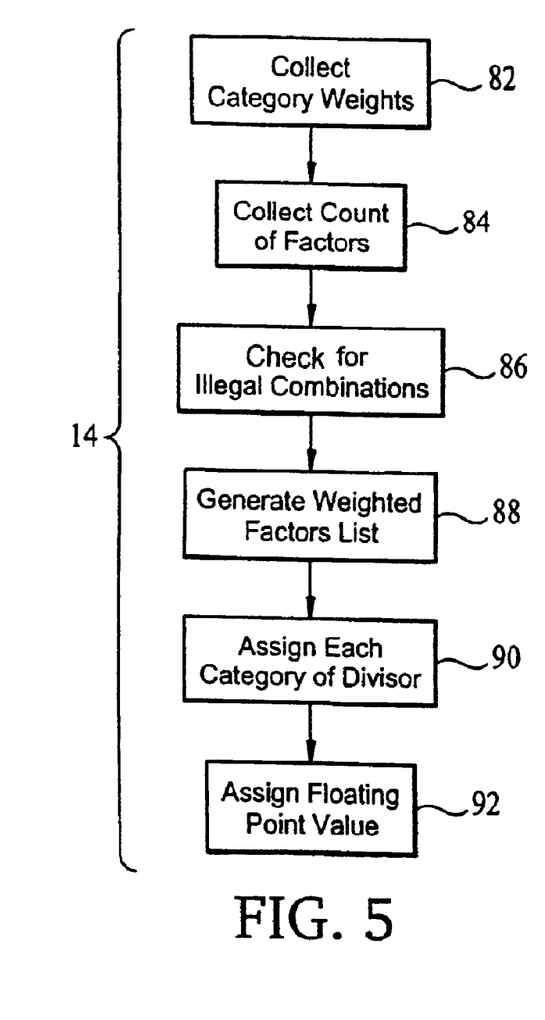
FIG. 5 is a flowchart of a subprocess for collating user input.

Referring to FIG. 5, process 10 collates (14) the user's input after the user submits HTML input form 40, by using a process 14. Process 14 collects (82) the category weights submitted by the user. For example, the "Environment" category 46 was selected as "high" and therefore carries a weight of "4," and the "Hiring practices" category 48 was selected as a "medium" so it carries a weight of "2." Process 14 collects (84) a count of the factors submitted for each category by the user. Since the user selected two factors, the "Tons of Toxic Waste" factor 52 and the "Tons of CO2" factor 54, the "Environment" category 46 has a count of 2. The "Hiring Practices" category 48 was not altered by the user so its count is two by default. Process 14 checks (86) for any illegal combinations of factors. The action of checking for illegal combinations protects third party database providers. For example, if the product, category is "beverages" and the only factor considered in the "beverages" category is "alcohol" then it would be simple to determine information on companies that exclusively sold alcohol. Thus, the database provider's database could be easily accessed. Process 14 generates (88) a weighted factors list initializing each factor's weight to 0.0. Process 14 assigns (90) each category a divisor value. If the category was expanded to show a detail view, and the count of factors submitted for that category equals zero, then the divisor equals zero. If the category was not in the detail view then the divisor equals the total number of factors associated with the rated category in the system. Otherwise, the divisor equals the number of factors submitted by the user. For example, the "Environment" divisor is 2 because that was the number of factors submitted by the user and the "Hiring" divisor is equal to 2 because the user did not request a detail view and there were two factors that made up the "Hiring" category 48. For each factor submitted, process 14 assigns (92) to the weighted factors list a floating point value equal to 1 divided by the divisor multiplied by the category weight. Therefore, the "Tons of Toxic Waste" factor 52 is equal to ½×4=2.0, and the "Tons of $CO_2$" factor 54 is equal to ½×4=2.0. The "Minority Workers" factor is equal to ½×2.0=1.0 and the "Female CEO" factor is equal to ½×2=1.0. The weighted factors list is populated and summarized in the following table.

|  | Weighted Factors |
| --- | --- |
| Tons of Toxic Waste | 2.0 |
| Tons of $CO_2$ | 2.0 |
| Superfund Sites | 0.0 |
| Minority Workers | 1.0 |
| Female CEO | 1.0 |

Process 10 selects (16) applicable companies based on the product category chosen by the user in the product category section 43. Therefore, only a subset of the companies in the database will be applicable in the search. The subset of companies is defined as all companies associated with a brand, and each brand is associated with the product category chosen by the user. For example, process 10 finds all the brands associated with the computer hardware product category such as Brand A, Brand B, and Brand C. Then, process 10 finds the company associated with each brand such as Company X (Brand A and Brand B) and Company Y (Brand C).

Process 10 determines (18) each company's ratings. Each company is rated by each factor. The rating is a scaled value that has been normalized from raw data to a scale between 0 and 9. For example, in the database, Company Q is the highest producer of carbon dioxide and releases 6 tons per year. The "Tons of $CO_2$" factor 54 would be a "9" for Company Q. Any other company that has less than 6 tons will receive a score below "9." The company that has the smallest amount of carbon dioxide company in the database is ranked a "1." If a company did not produce carbon dioxide it would receive a "0." For example, the following are the rated factors retrieved from the data base.

|  | Company A | Company B |
| --- | --- | --- |
| Tons of Toxic Waste | 7 | 3 |
| Tons of $CO_2$ | 8 | 4 |
| Superfund Sites | 5 | 4 |
| Minority Workers | 7 | 8 |
| Female CEO | 1 | 1 |

For each rated factor process 10 multiplies the company's rating in each factor by the weights in the weighted list for each factor. The total of all the factors is the company's final value.

|  | Company A | Company B |
| --- | --- | --- |
| Tons of Toxic Waste | 7 × 2 = 14 | 3 × 2 = 6 |
| Tons of $CO_2$ | 8 × 2 = 16 | 4 × 2 = 8 |
| Superfund Sites | 5 × 0 = 0 | 4 × 0 = 0 |
| Minority Workers | 7 × 1 = 7 | 8 × 1 = 8 |
| Female CEO | 1 × 1 = 1 | 1 × 1 = 1 |
| Total Score | 48 | 23 |

Figure 6:
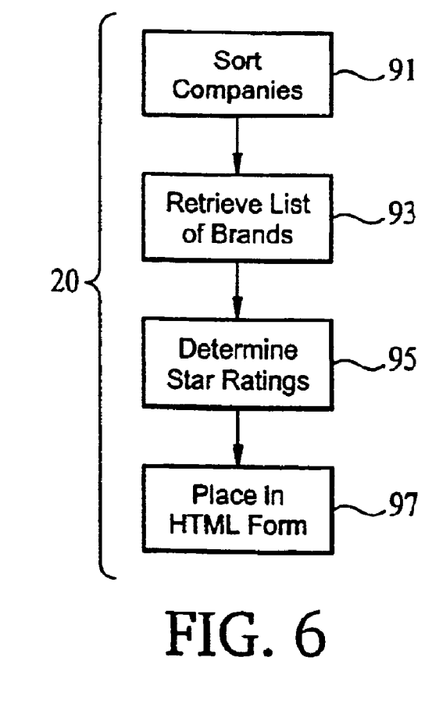
FIG. 6 is a flowchart of a subprocess for displaying the results of the search.
Figure 7:
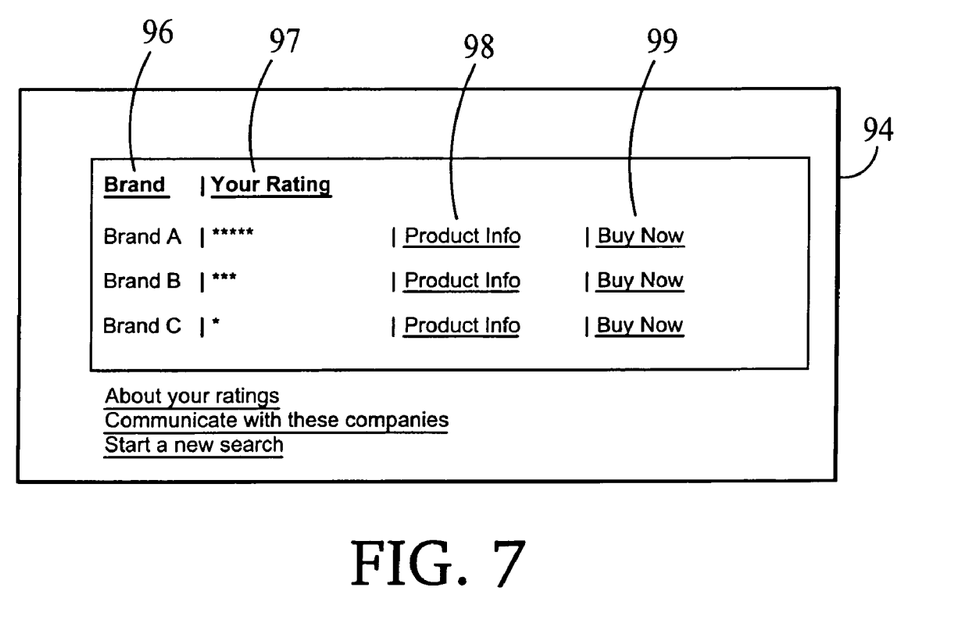
FIG. 7 is a screen shot showing the display results of a search for a product.

Referring to FIGS. 6 and 7, process 10 displays (20) search results. An exemplary implementation of displaying the search results displays the research results in a star ranking scheme. The star ranking scheme in this embodiment ranks the best product according to the user's choices with five stars and the worst product having one star. Process 20 sorts (91) the companies in descending order based on the company's final value. Process 20 retrieves (93) a list of brands associated with that company and the selected product category.

Figure 8:
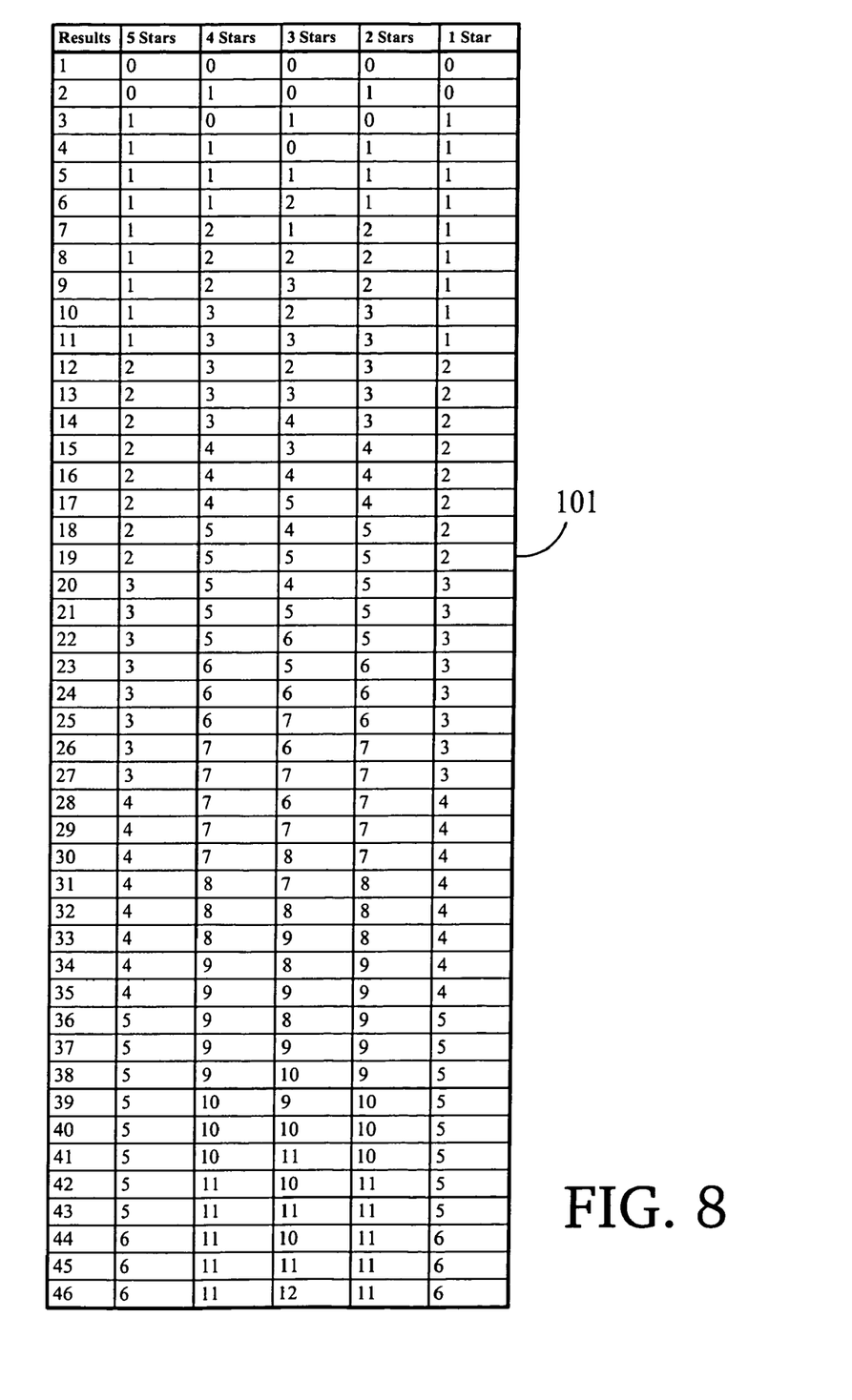
FIG. 8 is a look-up table.

Referring to FIGS. 6-8, process 20 determines (95) a star rating for each brand depending on the number of brands retrieved. Process 20 allocates the number of stars by using a look-up table 101. In the look-up table 101, five stars represents the best score and one star is the worst score. Four stars is above average of the scores retrieved and two stars is below average of the scores retrieved. Three stars is the average of the scores retrieved. For example, there are three brands retrieved: Brand A has a score of 67, Brand B has a score of 44, and Brand C has a score of 23. Using look-up table 101, Brand A gets five stars, Brand B gets three stars and Brand C gets one star.

Process 20 places (97) the brand rankings by stars in an HTML results box 94. A brand column 96 lists the brands in descending order. A "Your Ratings" column 97 indicates the stars corresponding to each brand. The user has an option of clicking a "Product Info" text button 98 to learn additional details on a corresponding brand. A "Buy Now" text button 99 allows the user to purchase a brand. By clicking on the "Buy Now" text button 99, all retailers associated with the brand are selected and sorted by commission. Commissions are in one of three formats: percentage of purchase price, click-through fee or other as determined by a business relationship with a commercial entity. A click-through fee is a fee paid by a seller to a web site operator that directs a buyer to the seller via the web page. Deals are sorted first by commission type, then high to low within the commission type. Commission types are displayed in the following order: Percentage, click-through, and other.

Figure 9:
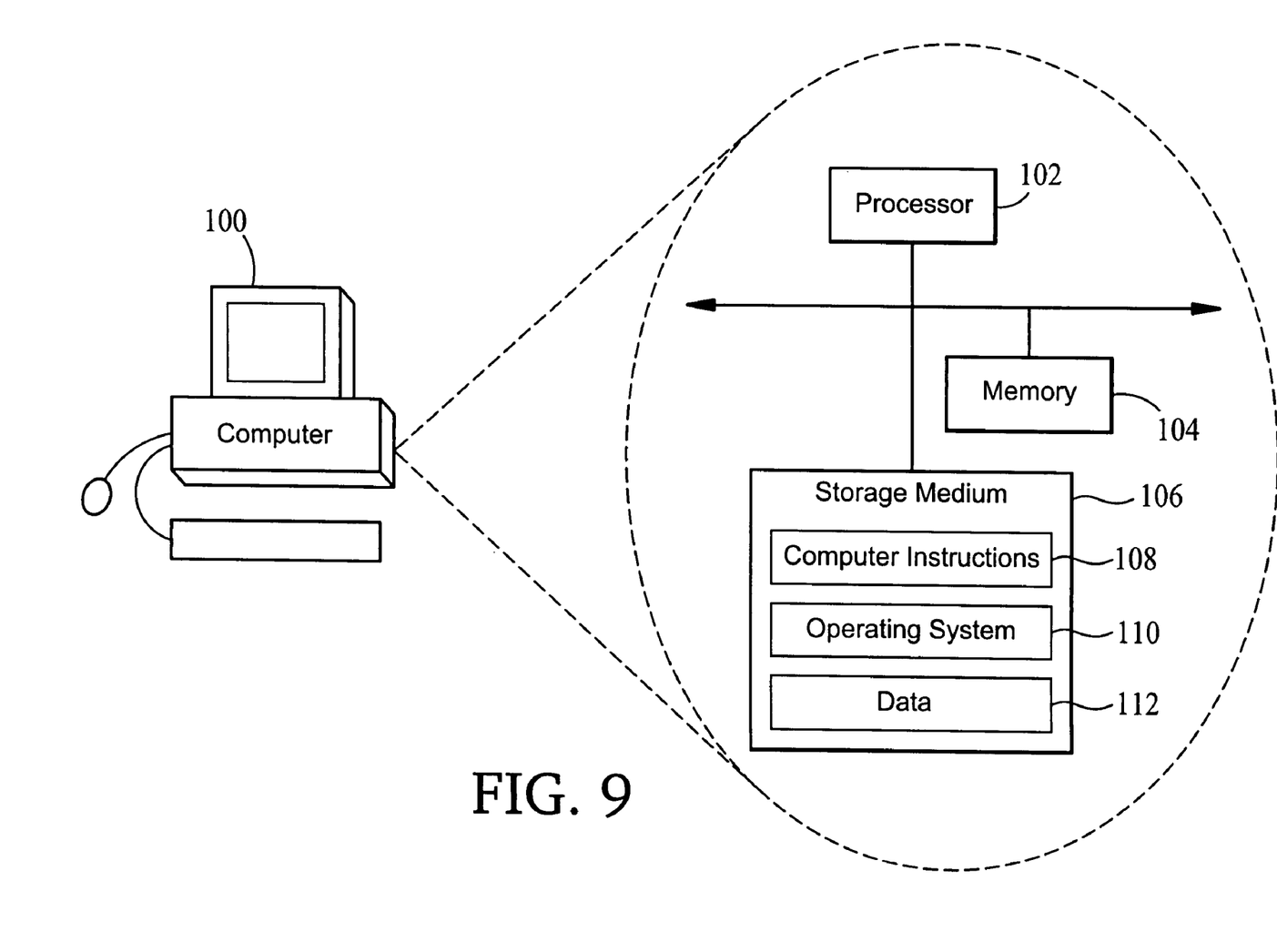
FIG. 9 is a block diagram of a computer system on which the process of FIG. 1 may be implemented.

FIG. 9 shows a computer 100 for ranking items using process 10. Computer 100 includes a processor 102 for ranking items, a memory 104, and a storage medium 106 (e.g., hard disk). Storage medium 106 stores operating system 110, data 112 storing the categorical scores, and computer instructions 108 which are executed by processor 102 out of memory 104 to perform process 10.

Process 10 is not limited to use with the hardware and software of FIG. 9; it may find applicability in any computing or processing environment and with any type of machine that is capable of running a computer program. Process 10 may be implemented in hardware, software, or a combination of the two. Process 10 may be implemented in computer programs executed on programmable computers/machines that each include a processor, a storage medium/article readable by the processor (including volatile and non-volatile memory and/or storage elements), at least one input device, and one or more output devices. Program code may be applied to data entered using an input device to perform process 10 and to generate output information.

Each such program may be implemented in a high level procedural or object-oriented programming language to communicate with a computer system. However, the programs can be implemented in assembly or machine language. The language may be a compiled or an interpreted language. Each computer program may be stored on a storage medium (article) or device (e.g., CD-ROM, hard disk, or magnetic diskette) that is readable by a general or special purpose programmable computer for configuring and operating the computer when the storage medium or device is read by the computer to perform process 10. Process 10 may also be implemented as a machine-readable storage medium, configured with a computer program, where upon execution, instructions in the computer program cause the computer to operate in accordance with process 10.

Figure 10:
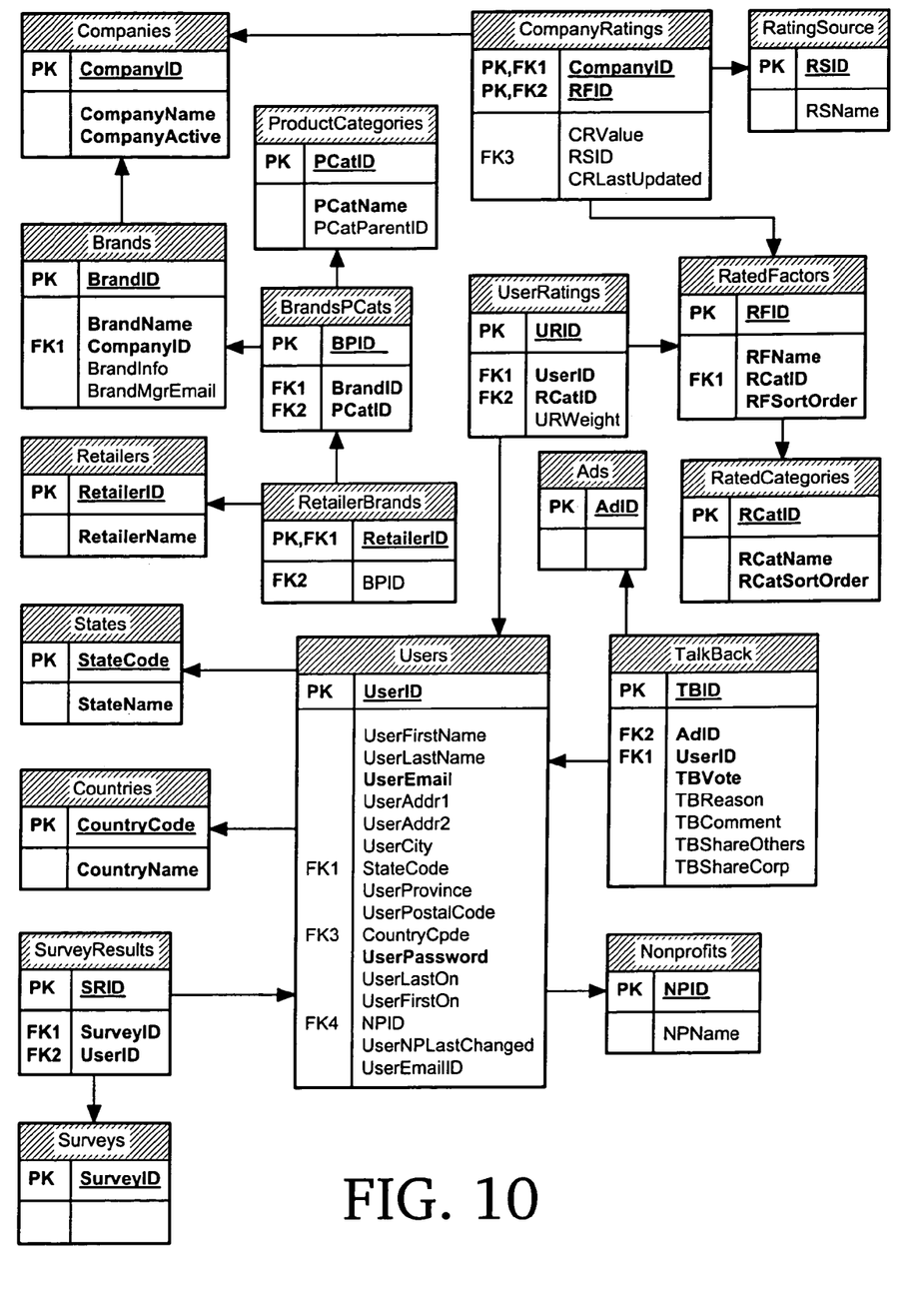
FIG. 10 is a block diagram of a database structure.

The process is not limited to the specific embodiments described herein. For example, process 10 need not be performed on the Internet. For example, process 10 can be used on a wide area network (WAN), a local area network (LAN) or on a stand alone personal computer based within a retail store. The process is not limited to items that are companies. Items may be any subject that can be ranked including people and organizations. The process is not limited to the categories described herein. The categories may be in other areas than social responsibility. For example, categories could be changed to include quality categories so that a user can weigh both area when searching for a product. The process is not limited to the five-star scale but can use any scale of measure to show variation amongst items. The process can also be applied to services. The process is not limited to the specific processing order of FIGS. 1, 3, 5, and 6. Rather, the blocks of FIGS. 1, 3, 5, and 6 may be re-ordered, as necessary, to achieve the results set forth above. In one embodiment, FIG. 10 represents the architectural database used to search information using social responsibility categories.

Other embodiments are also within the scope of the following claims.

What is claimed is:

1. A computer implemented method of ranking sources of products or services, the method comprising:

displaying, on a display, a user interface depicting a plurality of categories;

receiving in the user interface, weights assigned by the user to the categories, the weights indicating degrees of preference of the user for the categories, with the categories including at least one user selectable factor associated with sources of products or services;

determining total scores for the sources of products or services based on the user defined weights and user selected factors for the categories;

determining a ranking for the sources of products or services based on their respective total scores; and displaying, on the display, a result including the ranking of the sources of products or services.

2. The method of claim 1, further comprising:

displaying a set of factors for each category when selected by the user, each factor capable of being chosen by the user; and collating the categories weighted by the user, the factors chosen by the user, and a product chosen by the user.

3. The method of claim 2, further comprising:

selecting a list of companies that have the product; and determining a rating for each company based on the categories weighted by the user and the factors chosen by the user.

4. The method of claim 3, wherein selecting a list of companies comprises:

finding a set of brands associated with the product; and finding the company associated with each brand.

5. The method of claim 4, wherein displaying a search result comprises displaying the search result based on the factors chosen by the user.

6. The method of claim 5, wherein displaying a search result comprises ranking the brands on a five-star scale, the five-star scale including a one-star rating, a two-star rating, a thee-star rating, a four-star rating, and a five-star rating.

7. The method of claim 6 wherein the five star scale is base on a determined numeric ranking.

8. The method of claim 1, further comprising:

receiving information from an external database; and quantifying the data on a scale.

9. The method of claim 1, wherein displaying a search result comprises displaying a ranking of companies.

10. An apparatus comprising:

a memory that stores executable instructions for ranking sources of products or services based on a set of user preferences; and a processor that executes instructions to:

display a plurality of categories;

assign to the categories, weights defined by a user, the weights indicating degrees of preference of the user for the categories, the categories including at least one user selectable factor associated with sources of products or services;

determine, in a computer system, total scores for the sources of products or services, based on the user defined weights and user selected factors for the categories;

determine, in the computer system, a ranking for the sources of products or services based on their respective total scores; and display, on the display, a result including the ranking of the sources of products or services.

11. The apparatus of claim 10, further comprising instructions to:

display a set of factors for each category when selected by the user, each factor capable of being chosen by the user; and collate the categories weighted by the user, the factors chosen by the user, and a product chosen by the user.

12. The apparatus of claim 11, further comprising instructions to:

select a list of companies that have the product; and determine a rating for each company based on the categories weighted by the user and the factors chosen by the user.

13. The apparatus of claim 12, wherein instructions to select a list of companies comprises instructions to:

find a set of brands associated with the product; and find the company associated with each brand.

14. The apparatus of claim 13, wherein instructions to display a search result comprises instructions to display the search result based on the factors chosen by the user.

15. The apparatus of claim 14, wherein instructions to display a search result comprises instructions to rank the brands on a five-star scale, the five-star scale including a one-star rating, a two-star rating, a three-star rating, a four-star rating, and a five-star rating.

16. The apparatus of claim 15, further comprising instructions to use the five-star ranking as the highest of the ratings determined and the one-star ranking as the lowest of the ratings determined.

17. The apparatus of claim 10, further comprising instructions to:

receive information from an external database; and quantify the data on a scale.

18. The apparatus of claim 10, wherein instructions to display a search result comprises instructions to display a ranking of companies.

19. An article comprising a machine-readable medium that stores executable instructions for ranking sources of products or services based on a set of user preferences, the instructions causing a machine to:

display a plurality of categories;

receiving in a user interface, weights defined by a user, the weights indicating degrees of preference of the user for the categories, the categories including at least one user selectable factor associated with sources of products or services;

calculate total scores for the sources of products or services, based on the user defined weights and user selected factors for the categories;

determine a ranking for the sources of products or services based on their respective total scores; and display a result including the ranking of the sources of products or services.

20. The article of claim 19, further comprising executable instructions causing a machine to:

display a set of factors for each category when selected by the user, each factor capable of being chosen by the user; and collate the categories weighted by the user, the factors chosen by the user, and a product chosen by the user.

21. The article of claim 20, further comprising executable instructions causing a machine to:

select a list of companies that have the product; and determine a rating for each company based on the categories weighted by the user and the factors chosen by the user.

22. The article of claim 21, wherein executable instructions causing a machine to select a list of companies comprises executable instructions causing a machine to:

find a set of brands associated with the product; and find the company associated with each brand.

23. The article of claim 22, wherein executable instructions causing a machine to display a search result comprises executable instructions causing a machine to display the search result based on the factors chosen by the user.

24. The article of claim 23, wherein executable instructions causing a machine to display a search result comprises executable instructions causing a machine to rank the brands on a five-star scale, the five-star scale including a one-star rating, a two-star rating, a three-star rating, a four-star rating, and a five-star rating.

25. The article of claim 24, further comprising executable instructions causing a machine to use the five-star ranking as the highest of the ratings determined and the one-star ranking as the lowest of the ratings determined.

26. The article of claim 19, further comprising executable instructions causing a machine to:

receive information from an external database; and quantify the data on a scale.

27. The article of claim 19, wherein executable instructions causing a machine to display a search result comprises executable instructions causing a machine to display a ranking of companies.

28. A method of scoring sources of products or services, the method comprising:

displaying, on a display, a user interface depicting a plurality of categories;

receiving in the user interface, weights assigning by a user to the categories, the weights indicating degrees of importance of the categories to the user, with the categories including at least one user selectable factor, the sources of products or services being associated with the set of categories;

comparing the sources of products or services to a comparative group to determine those sources that belong to the comparative group; and calculating, in a computer system, total scores for those sources of products or services based on the user defined weights and user selected factors determined for those sources.

29. The method of claim 28, further comprising determining, in the computer system, a ranking for each of the sources of products or services belonging to the compartive group based on the total score for each of those sources of products or services; and displaying, on the display, a result including a ranking of the sources of products or services belonging to the comparative group.

30. The method of claim 28, further comprising using a market sector as the comparative group.

31. The method of claim 28, further comprising using an industry as the comparative group.

32. The method of claim 28, further comprising using a brand category as the comparative group.

33. The method of claim 28, further comprising using all sources as the comparative group.

34. The method of claim 28, further comprising using a named peer group as the comparative group.

35. The method of claim 28, further comprising using a company as the source.

36. The method of claim 28, wherein the user defined weights and the user selected factors is a numerical ranking.

37. The method of claim 28, further comprising calculating the user defined weights and user selected factors at a data point level.

38. The method of claim 37, wherein the user defined weights and the user selected factors is a numerical ranking.

39. An apparatus comprising:
- a memory that stores executable instructions for ranking sources of products or services based on a set of user preferences; and
- a processor that executes instructions to:
  - receive from a user, user defined weights for a plurality of categories and selections of user selectable factors belonging to the plurality of categories; and
  - compare the sources of products or services to a comparative group to determine those sources that belong to the comparative group; by:
    - calculate, in a computer system, total scores for the sources of products or services belonging to the compartive group based on the user defined weights and the user selected factors;
    - determine, in the computer system, a ranking for each of the sources of products or services belonging to the compartive group based on the total score for each of those sources of products or services; and
    - render a result that includes a ranking of the sources of products or services belonging to the comparative group.

40. An article comprising a machine-readable medium that stores executable instructions for ranking sources of products or services based on a set of user preferences, the instructions causing a machine to:
- receive from a user, user defined weights for a plurality of categories and selections of user selectable factors belonging to the plurality of categories;
- the sources of products or services to a comparative group to determine those sources that belong to the comparative group;
- calculate total scores for the sources of products or services based on the user defined weights and the user selected factors;
- determine a ranking for each of the sources of products or services belonging to the compartive group based on the total score for each of those sources of products or services; and
- display a result including a ranking of the sources of products or services belonging to the comparative group.

* * * * *